United States Patent
Patni et al.

(10) Patent No.: US 11,017,389 B2
(45) Date of Patent: May 25, 2021

(54) SYSTEMS, METHODS AND COMPUTER PROGRAM PRODUCTS FOR OTP BASED AUTHORIZATION OF ELECTRONIC PAYMENT TRANSACTIONS

(71) Applicant: Mastercard International Incorporated, Purchase, NY (US)

(72) Inventors: Gaurav K. Patni, Pune (IN); Ketan Shrikant Joshi, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 81 days.

(21) Appl. No.: 16/217,407

(22) Filed: Dec. 12, 2018

(65) Prior Publication Data
US 2019/0213585 A1    Jul. 11, 2019

(51) Int. Cl.
*G06Q 20/38*   (2012.01)
*G06Q 20/40*   (2012.01)
*H04L 29/06*   (2006.01)

(52) U.S. Cl.
CPC .......... *G06Q 20/385* (2013.01); *G06Q 20/40* (2013.01); *G06Q 20/4014* (2013.01); *H04L 63/0838* (2013.01)

(58) Field of Classification Search
CPC .................................... G06Q 20/385
See application file for complete search history.

(56) References Cited

U.S. PATENT DOCUMENTS

| | | | |
|---|---|---|---|
| 2012/0173348 A1* | 7/2012 | Yoo | G06Q 20/20 705/16 |
| 2014/0214678 A1* | 7/2014 | Williams | G06Q 20/401 705/44 |
| 2017/0070484 A1* | 3/2017 | Kruse | H04L 9/30 |
| 2017/0148009 A1* | 5/2017 | Perez Lafuente | G06Q 20/3821 |
| 2018/0089669 A1* | 3/2018 | Singh | G06Q 20/40 |

* cited by examiner

*Primary Examiner* — Scott C Anderson

(57) ABSTRACT

The invention provides methods, systems and computer program products for one-time-password (OTP) based payment authentication. The invention comprises receiving one or more specified transaction parameters corresponding to a specified transaction and generating at an authentication server, an OTP for authorizing a transaction payment corresponding to the specified transaction. The generated OTP is associated with the one or more specified transaction parameters, and may be transmitted to a user for subsequent use to authenticate identity of the user for executing the specified transaction.

20 Claims, 11 Drawing Sheets

| Pre-booked OTP | Payment Card Identifier / Number | Associated transaction amount | Associated Merchant Information | Purchase Date | Purchase Time |
|---|---|---|---|---|---|
| ABCDEF | wwww-xxxx-yyyy-zzzz | Indian Rupees 2,000 | Indian Railways Catering and Tourism Corporation | January 1, 2020 | 1400 hrs to 1800 hrs |

Figure 4

SYSTEMS, METHODS AND COMPUTER PROGRAM PRODUCTS FOR OTP BASED AUTHORIZATION OF ELECTRONIC PAYMENT TRANSACTIONS

CROSS-REFERENCE TO RELATED APPLICATION

This application is a U.S. National Stage filing under 35 U.S.C. § 119, based on and claiming benefits of and priority to Indian Patent Application No. 201811001152 filed on Jan. 10, 2018. The entire disclosure of the above application is incorporated herein by reference for all purposes.

FIELD OF THE INVENTION

The present invention relates to the field of electronic transactions, and more specifically to methods, systems and computer program products for a one time password (OTP) based authorization of electronic payment transactions.

BACKGROUND

Personal Identification Numbers (PINs) are used in connection with payment card or electronic payment account based transactions (for example at automated teller machines (ATM) or point of sale (POS) devices) for the purposes of authenticating the card holder or account holder. The underlying premise of PIN based authentication is that only an authorized person would have access to the correct PIN corresponding to a payment card or electronic payment account, and accordingly input of the correct PIN by a user is treated as verification of the identity of the individual providing the input.

Conventionally, static (i.e. permanent or non-changing) PINs were associated with a payment card or a payment account—and the card holder or account holder would use a static PIN repeatedly across multiple transactions. Static PINs have been found to pose a security risk—since a static PIN can be ascertained by unauthorized third parties by multiple means, including shoulder surfing, phishing, key stroke logging, packet sniffing or physical or network based techniques. Once a static PIN has been correctly identified by an unauthorized third party, the static PIN as well as the associated payment card or payment account is subject to misuse or fraudulent activity.

An accepted solution to the security threat posed by static PINs has been to use one-time-passwords (OTPs)—wherein a request for an OTP is generated specifically upon initiation of a payment transaction. Responsive to the request for an OTP, an OTP is generated by a server backend—and is transmitted to the card holder or account holder at a registered mobile number, registered email address or any other registered or predetermined location or identity associated with the card holder or account holder. Upon receipt of the generated OTP, the card holder or account holder submits said OTP as an authentication input—whereinafter, the identity of the card holder or account holder is confirmed and the payment transaction is authorized.

FIG. 1 illustrates a flowchart describing method steps for implementing an OTP based electronic payment transaction of a type known in the art.

Step 102 of FIG. 1 comprises initiating a session between a merchant device (for example a point-of-sale terminal device) and a merchant server in network communication with the merchant device. Step 104 comprises transmitting a transaction request from the merchant device to the merchant server. At step 106, a user may input or transmit payment card details or payment account details to the merchant device, which user inputs may be transmitted onward to the merchant server. While FIG. 1 illustrates implementation of an OTP based transaction through a merchant device, it would be understood that in certain implementations, the merchant device may be partially or entirely substituted by other network communication enabled devices. For example, in an online purchase transaction, the merchant device may be substituted by a network communication enabled data processing device (e.g. a personal computer or smartphone connected to the internet) that is capable of (i) receiving user inputs for initiating an electronic transaction, (ii) generating a corresponding electronic transaction request and (iii) transmitting the user inputs and/or electronic transaction requests to a merchant server or acquirer bank server.

At step 108, subsequent to receipt of the payment card details or payment account details at the merchant server, a request for an OTP may be transmitted to an authentication server through a communication network—which communication network may include any one or more of a data network(s), telecommunication network(s), wireless network(s), wired line network(s), internetwork(s) or hybrid(s) thereof. The request for an OTP may be generated at any of a user operated device (for example a user's mobile phone or smartphone), the merchant device, the merchant server, an acquirer bank server that is communicably interpositioned between the merchant device and the authentication server, or an issuer bank server that is communicably interpositioned between the merchant device and the authentication server. For example, where the transaction request of step 102 is generated by a merchant device in response to a card swipe event, the merchant device may additionally generate a request or an instruction for generation of an OTP—which request may be transmitted onward (either directly or indirectly) to the authentication server. If the transaction request of step 102 is generated as a result of interaction between a user's smartphone or mobile communication device and a merchant device (for example, through near-field-communication based interaction), the user may be prompted to trigger a request or an instruction for generation of an OTP through input provided at said user device. Alternatively, the request or instruction for generation of an OTP may be generated at any of the merchant server, acquirer bank server and issuer bank server, in response to such server receiving the electronic transaction request or any other communication related to the transaction request.

Step 110 comprises generating an OTP at the authentication server. At step 112, the generated OTP is transmitted to the user (for example at a registered email id associated with the user) or to a user device associated with the user (for example to a registered mobile device associated with the user). When the generated OTP is transmitted to the user device, said user device may be identified based on stored association information linking the user device with user 102a—which association information may be retrieved from a data repository that is capable of being accessed by the authentication server or by an issuer bank server. The stored association information may comprise any information that links the user with a corresponding user device, or that enables, in respect of each user, identification of a corresponding user device. In some cases, the stored association information may comprise primary key information or secondary key information that associates each user 102a with a corresponding user device 102b within a relational database.

At step 114, upon receipt of the OTP, the user inputs the received OTP into a device configured to transmit the input OTP to the authentication server (either directly or through one or more communication intermediaries—which may include any of a merchant server, acquirer bank server, payment network or issuer bank server). The device at which the user inputs the received OTP may comprise any device capable of direct or indirect network communication with the authentication server, and may in various embodiments include any of a user device, a merchant device or any processor enabled device that is configured for network based communication with the authentication server or merchant server. At step 116, the submitted OTP is verified by the authentication server, and depending on whether the submitted OTP matches the OTP previously generated by the authentication server and transmitted to the user, the authentication server approves or rejects the requested transaction.

It has been found that OTP based authentication suffers from drawbacks—particularly in situations where the user location has poor network connectivity (e.g. having poor or non-existent mobile phone network connectivity or poor or non-existent internet connectivity). The poor connectivity prevents transmission of a generated OTP to the user's mobile device, or may prevent the user from accessing an OTP that has been transmitted to the user's registered email address. It has additionally been found that in certain situations, the time between requesting of an OTP and receipt of the OTP at a user mobile device can be unacceptably large—which presents challenges for users that require an OTP for time sensitive transactions. Examples of time sensitive transactions include transactions where an OTP expires within a predefined time limit (forcing the user to regenerate the request after expiry of the predefined time limit) or where the user is seeking to purchase an item or article that is in high demand (for example railway tickets, or products being offered in an online flash sale)—in which case, a delay in receiving the OTP may result in the item or article being sold out.

There is accordingly a need for mechanisms that offer the enhanced security of an OTP while addressing the potential challenges presented by low or insufficient network connectivity at a user location.

SUMMARY

The invention provides systems, methods and computer program products for improved OTP based authentication for electronic transactions.

In an embodiment, the invention comprises a method for one-time-password (OTP) based payment authentication. The method comprises (i) receiving at an authentication server, one or more specified transaction parameters corresponding to a specified transaction, (ii) generating at the authentication server, a first OTP for authorizing a transaction payment corresponding to the specified transaction, (iii) associating the first OTP with the one or more specified transaction parameters, and recording the first OTP and the associated one or more specified transaction parameters within a non-transitory memory, (iv) receiving at the authentication server (a) a second OTP input by a user subsequent to commencement of the specified transaction, and (b) one or more detected transaction parameters corresponding to the commenced specified transaction, and (v) authorizing the transaction payment responsive to determination of a match between the first OTP and the second OTP, and between the one or more specified transaction parameters and corresponding one or more detected transaction parameters.

In an embodiment of the method, the specified transaction parameters include information identifying a payment card or payment account intended to be used for the transaction payment. In another embodiment, the first OTP may be transmitted from the authentication serve to a target device or target electronic account associated with the identified payment card or payment account.

The specified transaction parameters or the detected transaction parameters may include any one or more of a merchant identifier, identifier corresponding to an item, article or service, transaction type, transaction amount, one or more dates for transaction execution, one or more times for transaction execution, a device identifier associated with a device through which the transaction request is received, and information identifying a payment card or payment account for enabling the transaction payment.

In an embodiment, the information identifying the payment card or payment account includes one or more of a unique identifier associated with the payment card or payment account, issuer bank information, payment network information, validity information, card verification value (CVV) number, card holder or account holder identity information, issuer bank identifier, issue date and expiry date associated with the payment card or payment account.

The one or more specified transaction parameters may be received at the authentication server prior to initiation of the specified transaction or prior to initiation of a network session for execution of the specified transaction. In a specific embodiment, the first OTP is transmitted to the target device or target electronic account prior to initiation of the specified transaction or prior to initiation of a network session for execution of the specified transaction.

In an exemplary embodiment of the method, the step of generating the first OTP includes the step of deducting a transaction amount corresponding to the specified transaction from available credit associated with the payment card or payment account. In a more particular embodiment, the transaction amount is deducted from available credit associated with the payment card or payment account prior to initiation of the specified transaction or prior to initiation of a network session for execution of the specified transaction.

The invention additionally provides a computer implemented system for one-time-password (OTP) based payment authentication. The computer implemented system comprises a processor implemented authentication server configured to (i) receive one or more specified transaction parameters corresponding to a specified transaction, (ii) generate a first OTP for authorizing a transaction payment corresponding to the specified transaction, (iii) associate the first OTP with the one or more specified transaction parameters, and recording the first OTP and the associated one or more specified transaction parameters within a database that is communicatively coupled with said authentication server, (iv) receive a second OTP input by a user subsequent to commencement of the specified transaction; (v) receive one or more detected transaction parameters corresponding to the commenced specified transaction, and (vi) authorize the transaction payment responsive to determination of a match between the first OTP and the second OTP, and between the one or more specified transaction parameters and corresponding one or more detected transaction parameters.

In an embodiment of the computer implemented system, the specified transaction parameters may include information identifying a payment card or payment account intended to be used for the transaction payment. Further, the authentication server may be configured to transmit the first OTP to a target device or target electronic account associated with the identified payment card or payment account.

In a specific embodiment of the computer implemented system, the specified transaction parameters or the detected transaction parameters may include any one or more of a merchant identifier, identifier corresponding to an item, article or service, transaction type, transaction amount, one or more dates for transaction execution, one or more times for transaction execution, a device identifier associated with a device through which the transaction request is received, and information identifying a payment card or payment account for enabling the transaction payment.

In another embodiment, the information identifying the payment card or payment account may include one or more of a unique identifier associated with the payment card or payment account, issuer bank information, payment network information, validity information, card verification value (CVV) number, card holder or account holder identity information, issuer bank identifier, issue date and expiry date associated with the payment card or payment account.

In a system embodiment, the one or more specified transaction parameters may be received at the authentication server prior to initiation of the specified transaction or prior to initiation of a network session for execution of the specified transaction. Additionally, the first OTP may be transmitted to the target device or target electronic account prior to initiation of the specified transaction or prior to initiation of a network session for execution of the specified transaction.

The authentication server of the computer implemented system may be configured such that generating the first OTP includes deducting a transaction amount corresponding to the specified transaction from available credit associated with the payment card or payment account. In an embodiment, the transaction amount is deducted from available credit associated with the payment card or payment account prior to initiation of the specified transaction or prior to initiation of a network session for execution of the specified transaction.

The invention also provides a method for one-time-password (OTP) based payment authentication, comprising the steps of (i) receiving through a user interface, user input for session initiation, said user input for session initiation comprising one or more of user identity information and user authentication information, (ii) responsive to verification of a user's identity based on the user identity information or user authentication information, initiate a communication session with an authentication server, (iii) receiving through the user interface (a) user input initiating a request for a transaction specific OTP, and (b) user input identifying one or more transaction parameters for association with an OTP generated in response to said request for the transaction specific OTP, wherein the identified one or more transaction parameters include any one or more of a merchant identifier, identifier corresponding to an item, article or service, transaction type, transaction amount, one or more dates for transaction execution, one or more times for transaction execution, and a device identifier associated with a device through which the transaction request would be received, and (iv) initiating transmission of the request for a transaction specific OTP and the identified one or more transaction parameters to the authentication server.

In an embodiment of said method, the authentication server with which the communication session is initiated is a server configured to (i) receive the request for the transaction specific OTP and the identified one or more transaction parameters, (ii) generate a first OTP, (iii) associate the first OTP with the identified one or more transaction parameters, and record the first OTP and the identified one or more specified transaction parameters within a non-transitory memory, (iv) receive (a) a second OTP input by a user subsequent to commencement of a payment transaction, and (b) one or more detected transaction parameters corresponding to said payment transaction, and (v) authorize an electronic payment corresponding to the payment transaction, responsive to determination of a match between the first OTP and the second OTP, and between the identified one or more identified transaction parameters and corresponding one or more detected transaction parameters.

The method may include the further steps of (i) receiving a transaction specific OTP generated by the authentication server, which transaction specific OTP has been associated with the identified one or more transaction parameters by the authentication server, and (ii) displaying the received transaction specific OTP.

In an embodiment of the method, the authentication server with which the communication session is initiated, is a server configured to transmit the first OTP to a target device or target electronic account associated with any of the user or a payment card or payment account corresponding to the user.

BRIEF DESCRIPTION OF THE ACCOMPANYING DRAWINGS

FIG. 4 illustrates an exemplary data structure for storing pre-booked OTP(s) and associating said pre-booked OTP(s) with corresponding transaction parameters.

DETAILED DESCRIPTION

Figure 1:
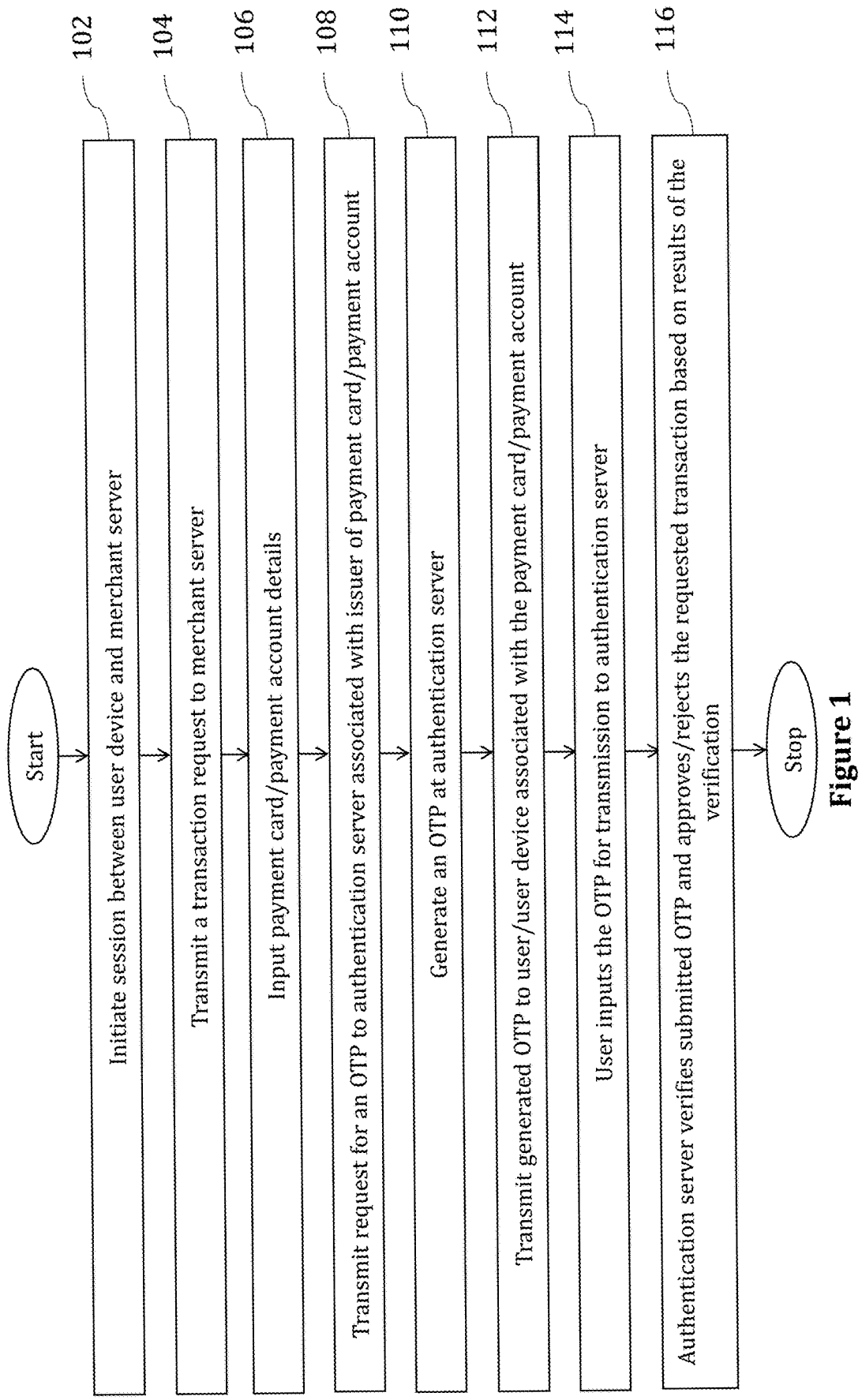
FIG. 1 is a flow chart illustrating a method for OTP based transaction authentication of a type known in the art.

The present invention provides systems, methods and computer program products for improved OTP based authentication for electronic transactions. As discussed in more detail hereinbelow, the invention improves upon the existing state of art by enabling generation of an OTP in advance of generation of a transaction request—such that the generated OTP (i.e. pre-booked OTP) may be securely used for the purpose of implementing a future transaction.

For the purposes of the present invention, the following terms shall be understood to also have the corresponding meanings provided below, in addition to plain and dictionary meanings thereof.

"Acquirer" shall mean a business (e.g., a financial institution or a merchant bank) that contracts with a merchant to coordinate with the issuer network of a customers' payment card or payment account. In various embodiments, an Acquirer may communicate directly with the issuer network, or alternatively through an intermediate network such as a payment card network or through a payment network or payment account service provider that is responsible for hosting the customer's payment account.

"Acquirer bank server" shall refer to one or more servers, including hardware, software and other equipment used by an Acquirer to transmit and process payment card based transactions or payment account based transactions, as well as information related to merchants, customers, payment cards, payment accounts and/or transactions.

"Authentication Server" shall mean any one or more servers, including hardware, software and other equipment configured to perform identity authentication of an individual requesting execution of an electronic payment transaction.

"Card holder" or "Account Holder" shall mean an authorized payment card user or an authorized user of a payment account who is making a purchase or effecting an electronic transaction with a payment card or a payment account.

"User Device" shall mean any processor implemented device having network communication capabilities that a user uses for requesting or generating a pre-booked OTP, receiving information relating to the pre-booked OTP or relating to an intended electronic payment transaction, or executing an electronic payment transaction, and includes without limitation any network communication enabled computing device or mobile communication device.

"Issuer" shall mean a financial institution that issues payment cards or payment accounts to users.

"Issuer bank server" shall refer to one or more servers, including hardware, software and other equipment used by an Issuer to transmit and process payment card transactions or payment account transactions and information related to customers, payment cards, payment accounts and/or transactions.

"Merchant" shall mean an authorized acceptor of payment cards or payment from a payment account for the payment of goods or services sold by the merchant.

"Merchant device" shall mean any processor implement device configured to communicate directly or indirectly with a merchant server or with an acquirer bank server corresponding to the concerned merchant's bank account, for enabling a user or customer to initiate an electronic payment transaction through said device. For the purposes of the present invention, merchant devices may include without limitation, any of a point-of-sale terminal, a network communication enabled computer, a suitably programmed mobile communication device, or a personal digital assistant with communication capabilities.

"Merchant server" shall refer to one or more servers, including hardware, software and other equipment used by a merchant to transmit and process payment card transactions or payment account transactions and information related to customers, payment cards, payment accounts and/or transactions.

"OTP database" shall refer to one or more database repositories configured to enable storage and retrieval of one-time-passwords generated by a system, and to optionally enable storage and retrieval of parameters, properties and/or associations corresponding to stored one-time-passwords.

"Payment account" shall mean any account that may be used for the purposes of effecting an electronic payment or electronic transaction, and shall include any electronic transaction account, payment card account, bank account or electronic wallet account.

"Payment card" shall mean a card or data associated with a payment account to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

Figure 2:
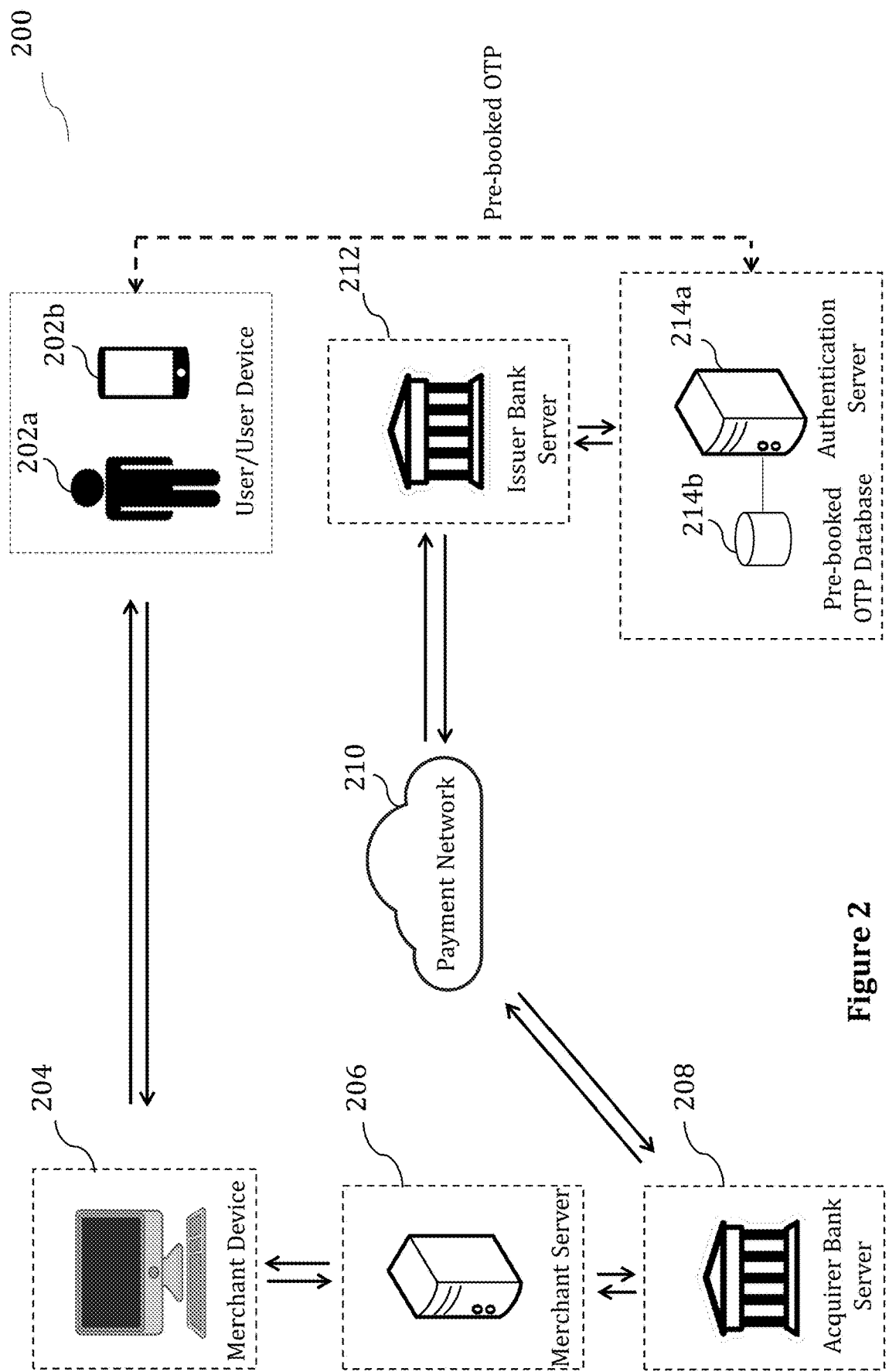
FIG. 2 illustrates a system environment and entities involved in OTP based transaction authentication according to the present invention, along with the communication flow between the entities.

"Payment network" shall refer to any intermediary network communicatively disposed between any two or more of the merchant server, acquirer bank server and issuer bank server. In certain embodiments, the payment network may comprise a card network (for example, Mastercard® or Visa®) that enables communication between the issuer bank and the acquirer bank. In such embodiments, the card network primarily coordinates payment card transactions between acquirers and issuers, and additionally coordinates clearing and settlement services to transfer payments from issuers to merchants FIG. 2 illustrates a system environment that may be particularly configured to implement OTP based electronic transactions in accordance with the present invention. The illustrated environment comprises system 200 configured for implementing an electronic payment transaction involving a pre-booked OTP. The electronic payment transaction involves payment by way of a payment card or payment account. System 200 includes merchant device 204, merchant server 206, acquirer bank server 208, payment network 210, issuer bank server 212 and authentication server 214*a*. Authentication server 214*a* may be communicably coupled with pre-booked OTP database 214*b*. User 202*a* may in an embodiment have access to user device 202*b*— which user device 202*b* may in an embodiment comprise a processor enabled device having wireless communication capability and/or network communication capability, and which may in a more specific embodiment include any mobile communication device.

In the illustration of FIG. 2, a transaction request may be initiated at merchant device 204—in response to detection of a transaction initiation event (for example detection of a payment card swipe event, detection of a payment card or payment account based on data received via near-field communication or any other communication protocol, or any other defined or authorized transaction initiation event). The transaction request comprises a request for implementing a selected transaction through merchant server 206. Merchant device 204 communicates the transaction request to merchant server 206, which transaction request is communicated onward from merchant server 206 to acquirer bank server 208. In certain embodiments, merchant device 204 may be configured to communicate the transaction request directly to acquirer bank server 208 without requiring an intervening merchant server 206. In an embodiment, acquirer bank server 208 may comprise a bank server corresponding to a bank or a bank account at which or through which the merchant requires to receive payment for the transaction under implementation.

Acquirer bank server 208 receives payment card or payment account information corresponding to user 202a. Acquirer bank server 208 thereafter uses said payment card or payment account information to forward the transaction request to issuer bank server 212 through payment network 210. In an embodiment, issuer bank server 212 comprises a bank server associated with a bank at which the user 202a holds a payment account or with a bank that has issued a payment card to the user.

Implementation of pre-booked OTP based electronic transactions according to the present invention within the system environment illustrated in FIG. 2 is discussed below in connection with the flowchart of FIG. 3.

Figure 3:
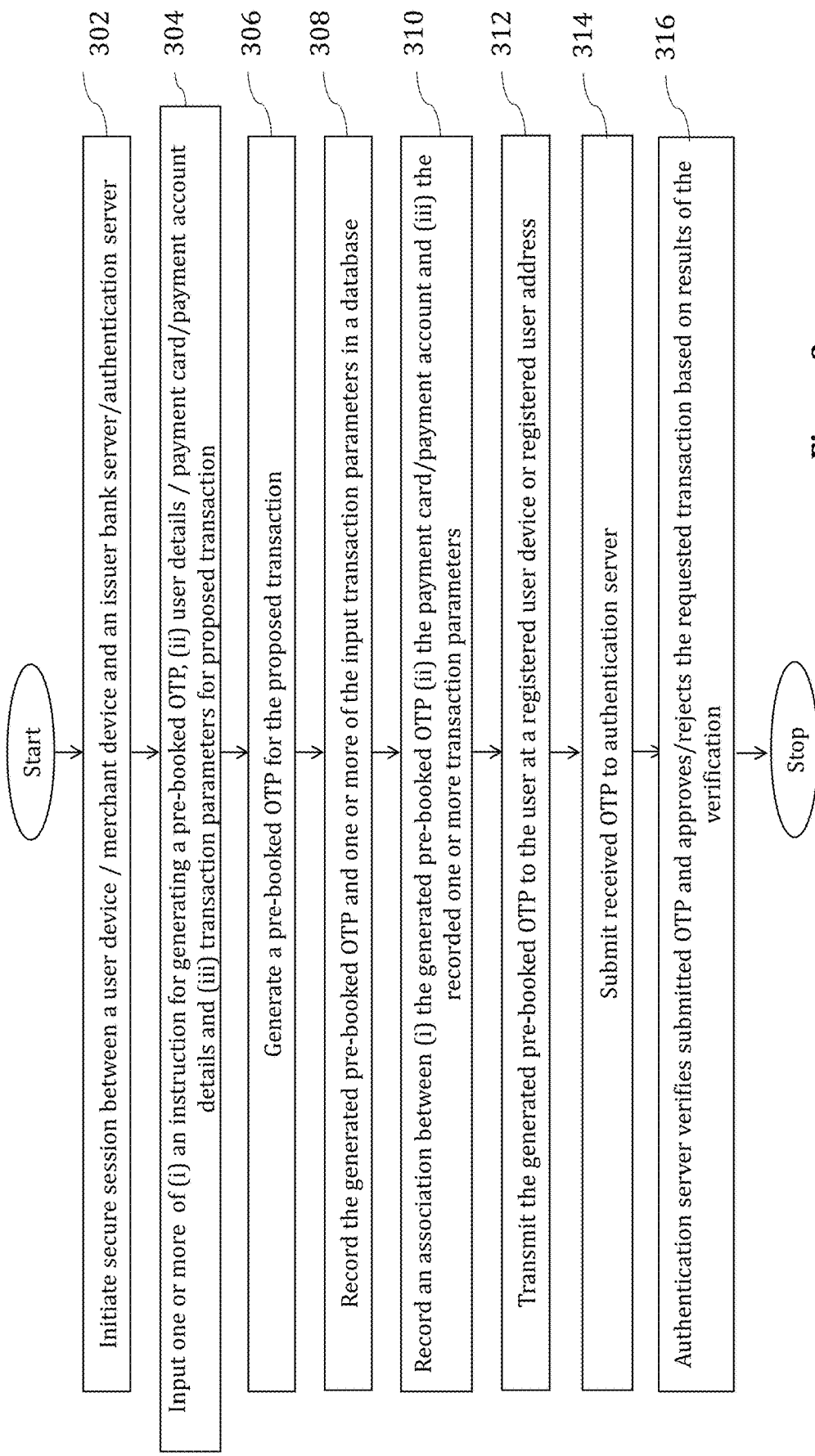
FIGS. 3, 5, 6 and 10 illustrate methods for generating a pre-booked OTP in accordance with the present invention.

FIG. 3 illustrates a flowchart identifying method steps for implementing an OTP based electronic payment transaction in accordance with the present invention. In particular, FIG. 3 illustrates a method of generating a pre-booked OTP which may be used for achieving the purposes of the invention. In various embodiments, a pre-booked OTP may be generated for authenticating a future payment transaction, wherein the pre-booked OTP is generated in advance of (i) commencement of a payment transaction, or (ii) initiation of a transaction request.

For the purposes of the following description, the method steps of FIG. 3 may be understood to be implemented within the system environment of FIG. 2. However, it would be understood that the method steps of FIG. 3 may equally be implemented within other appropriately configured system environments as well (for example the system environment illustrated in FIG. 7).

At step 302 of FIG. 3, a secure network session is initiated with either issuer bank server 212 or authentication server 214a. The network session may be initiated through any of a number of devices, including any one or more of user device 202b, merchant device 204, or merchant server 206. The selection of a device through which the network session is initiated with issuer bank server 212 or authentication server 214a may vary according to the specific transaction implementation. For example, in an implementation where pre-booked OTP based authentication is being used in connection with an electronic payment transaction being executed at a merchant device (e.g., a point-of-sale terminal), the network session may be initiated between merchant device 204 on one side and one of issuer bank server 212 or authentication server 214a on the other side.

In an implementation where pre-booked OTP based authentication is being used in connection with an electronic payment transaction being executed using a mobile software application on a user device (for example, an internet services enabled smartphone), the network session may be initiated between user device 202b on one side and one of issuer bank server 212 and authentication server 214a on the other side. In another implementation, where pre-booked OTP based authentication is being used in connection with an electronic payment transaction being executed at an online web-site (e.g., an e-commerce website hosted on a merchant server) that has been accessed through the web browser of an internet enabled computer or any other user device, the network session may be initiated between merchant server 206 or the internet enabled computer or user device on one side, and the issuer bank server 212 or authentication server 214a on the other side. In various embodiments of the invention, the secure network session may comprise an internet protocol (IP) based session.

At step 304, a user inputs one or more of (i) an instruction to generate a pre-booked OTP, (ii) user details and/or payment card or payment account details of the user—with which the generated pre-booked OTP may be associated and (iii) specified transaction parameters corresponding to a proposed payment transaction that is intended to be executed by the user in the future—for which transaction, generation of the pre-booked OTP is required. A more detailed explanation regarding the specific user inputs that may be submitted at step 304 (and the situations in which said specific user inputs may be necessitated) are discussed in more detail in connection with FIGS. 5 and 6.

For the purposes of step 304, user details and payment card and payment account details of the user may respectively include any details relevant to identifying the user or a payment card or payment account (that is associated with a user) from which payment is to be made. In certain embodiments, one or more of the user details, payment card details or payment account details submitted at step 304 may comprise details that enable authentication of identity of the user entering said details. In an embodiment, the user details may include without limitation, any of a user name, user birth date, user address, user financial information, and/or a variety of other user information known in the art. The payment card details may include any of a unique payment card number, issuer bank details, card network details, validity information, card verification value (CVV) number, card holder identity information, issuer bank identifier, issue date, expiry date and any other payment card information that is known in the art. Likewise, the input payment account details may include any of a unique payment account number, issuer bank information, account holder information, and any other payment account information that is known in the art.

For the purposes of step 304, transaction parameters that may be input by a user in connection with the proposed payment transaction may include any information that is relevant to definitively identifying a future transaction for which the requested OTP is intended to be used. Exemplary specified transaction parameters may include any one or more or all of a merchant identifier, identifier corresponding to an item, article or service towards which payment is intended to be made, transaction type, transaction amount (e.g., a specific transaction amount, or a transaction amount cap, or an acceptable range for a transaction value), transaction date or range of dates within which the transaction may be executed, or a defined time window (e.g. specific hours within a selected day or range of dates—for example, the defined time window may comprise a prescribed time slot between 12 noon to 4 p.m. within a single day, or across a range of dates) within which the transaction is intended to be executed, identifiers associated with processor implemented device (e.g. a network communication enabled computer or smartphone or mobile communication) through which the transaction request is intended to be forwarded, or any other parameters associated with the future transaction. In an embodiment of the invention, the transaction parameters may include the user details and/or payment card or payment account details of the user.

The inputs at step 304 may be received at any processor implemented device that is in network communication with one or more of a merchant server 206, acquirer bank server 208, issuer bank server 212 or authentication server 214a. The received inputs may be transmitted from the device at which they are received from the user, to authentication server 214a—for example by way of one or more network communications routed through any of the merchant server 206 or issuer bank server 212 or through any other network intermediary.

For the purposes of explanation, we may consider the case of a user (i) having a Mastercard® credit card issued by Bank of America, bearing credit card number wwww-xxxx-yyyy-zzzz, valid up to July 2019, and having a CVV "123" (collectively, the payment card details for the transaction), and (ii) who intends to use this credit card to execute payment of Indian Rupees (INR) 2,000 towards online purchase of a railway ticket from the Indian Railways Catering and Tourism Corporation (IRCTC) website for a New Delhi-Mumbai train, during an anticipated purchase period of between 2 pm and 6 pm on Jan. 1, 2020, or any other specific future date (collectively, the transaction parameters of the proposed transaction). In the cited illustration, step 304 may comprise inputting of any one or more of the above payment card details and specified transaction parameters by the user, and subsequent transmission of the payment card details and specified transaction parameters that have been input, to authentication server 214a.

At step 306, a pre-booked OTP is generated for the purposes of authenticating the proposed transaction. The pre-booked OTP may be generated by authentication server 214a.

Step 308 thereafter comprises recording the generated pre-booked OTP in a database, and also recording an association(s) (or relationship(s)) between one or more of the specified transaction parameters and the pre-booked OTP in said database. In an embodiment, the generated pre-booked OTP and the association(s) with corresponding specified transaction parameters may be recorded in pre-booked OTP database 214b. In a specific embodiment, the recorded transaction parameters may include user details and/or payment card or payment account details of the user.

Step 310 of FIG. 3 comprises the step of additionally recording within said database, one or more associations between (i) the generated pre-booked OTP, (ii) the payment card or payment account designated by the user for the proposed transaction payment and (iii) the one or more specified transaction parameters.

For the purposes of explaining steps 308 and 310, and in continuation of the illustrative example discussed in connection with step 304, we may consider an example where the pre-booked OTP generated at step 308 is a 6 character alphanumeric OTP "ABCDEF". For the purposes of explaining the manner in which the generated pre-booked OTP and transaction parameters may be recorded and associated, FIG. 4 illustrates table 400 showing a data record within an exemplary data structure or database structure that may be used to record the pre-booked OTP ("ABCDEF") and transaction parameters that are recorded and associated with said pre-booked OTP.

As shown in FIG. 4, the exemplary data structure has been configured to record and associate the pre-booked OTP ("ABCDEF") with (i) the corresponding payment card identifier or payment card number (wwww-xxxx-yyyy-zzzz), (ii) the associated transaction amount for which the OTP has been generated and may be used (Indian Rupees 2,000), (iii) the associated merchant information for the intended transaction (Indian Railways Catering and Tourism Corporation), (iv) the purchase date (i.e. the date on which the pre-booked OTP may be used for the transaction—Jan. 1, 2020) and (v) the purchase time (i.e. a specified time window within the purchase date, when the pre-booked OTP may be used for the transaction—in this case 1400 hrs to 1800 hrs). It would be understood that in various embodiments, the pre-booked OTP may be associated with some or all of the illustrated transaction parameters, or with a set of transaction parameters which include some or all of the illustrated transaction parameters, or with an entirely different set of transaction parameters.

Thereafter at step 312, the generated pre-booked OTP is transmitted from the authentication server 306a to the user through any secure method for use in connection with the proposed transaction. Secure methods for transmission of the pre-booked OTP to the user may include transmission by means of email, text, short message service, mail, voice call or telephone call, or electronic or physical dropbox, transmission to a registered user device, transmission to a registered user address, transmission to an electronic link or electronic account accessible by the user, or transmission to and display by means of a software application installed on a user's mobile communication device.

While not illustrated in FIG. 3, in an embodiment of the method, generating a pre-booked OTP for the proposed transaction additionally comprises deducting the transaction amount corresponding to the proposed transaction, from the available credit limit or credit balance associated with the payment card or payment account in question. By deducting the transaction amount on generation of the pre-booked OTP and prior to commencement of the payment transaction, the method ensures that the user does not exceed his available credit limit or credit balance by executing other transactions between generation of the pre-booked OTP and execution of the proposed transaction. In an embodiment, the deducted transaction amount may be re-credited to the available credit limit or credit balance associated with the payment card or payment account in case (i) the user cancels or invalidates the pre-booked OTP without executing the payment transaction, or (ii) the pre-booked OTP is not utilized for authenticating a transaction within the defined time window associated with said transaction—resulting in expiry of the pre-booked OTP.

Figure 5:
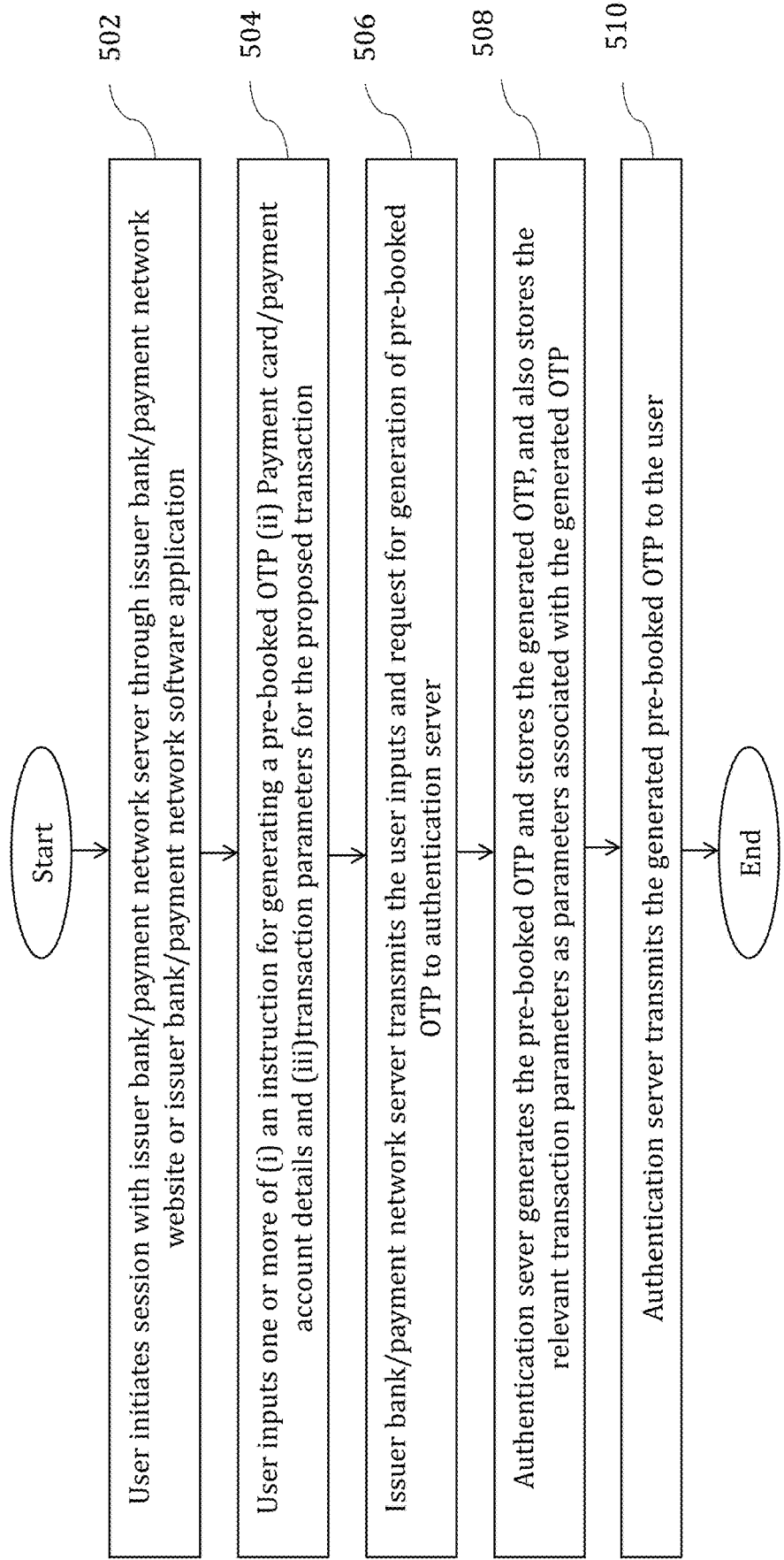
Figure 6:
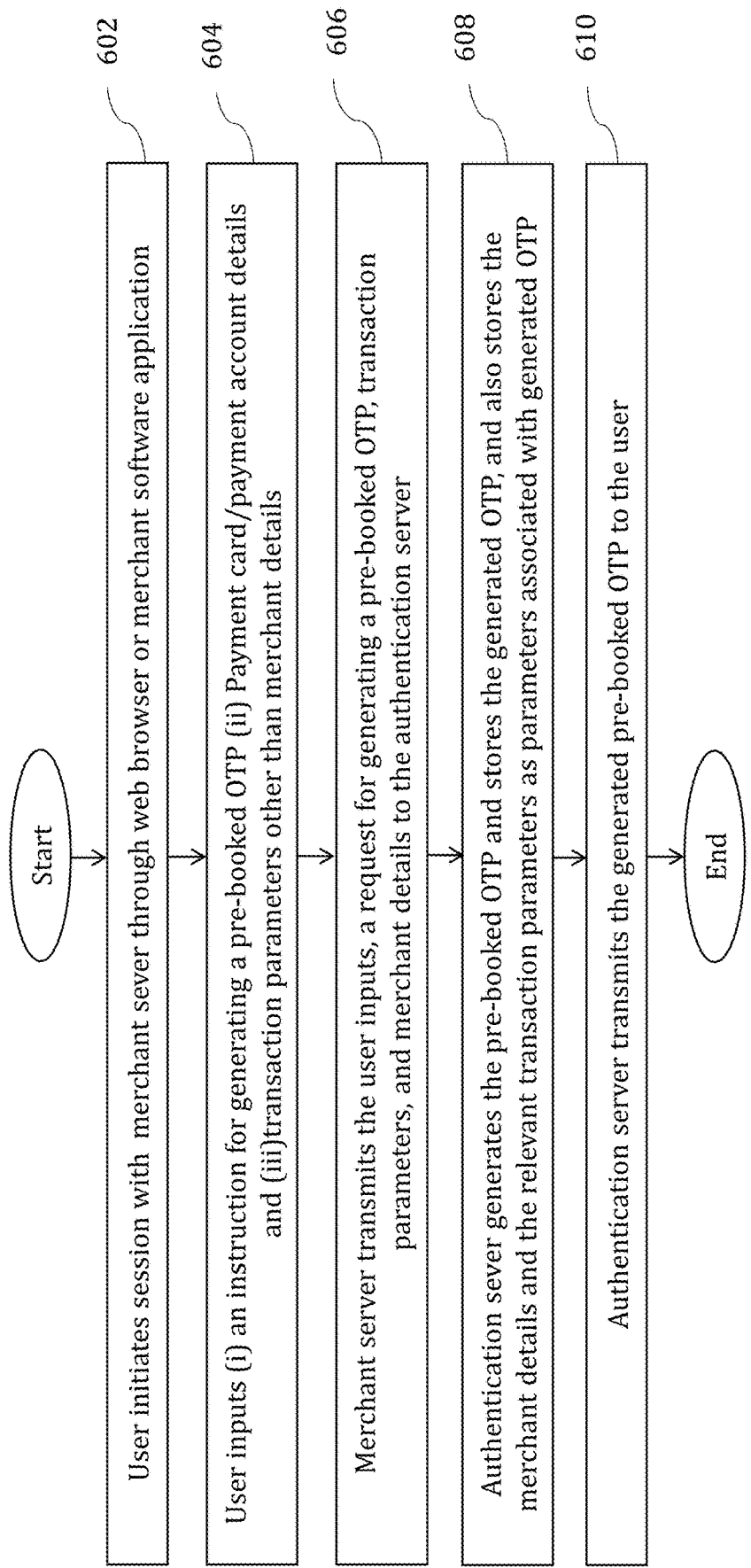

FIGS. 5 and 6 illustrate in more detail, exemplary embodiments of step 304 of FIG. 3 (and subsequent steps of FIG. 3)—wherein a user inputs instructions and/or information for initiating generation of a pre-booked OTP. The method steps of FIGS. 5 and 6 are discussed below with reference to the abbreviated system environment 700 illustrated in FIG. 7—but may equally be implemented in any other appropriate system environment.

Figure 7:
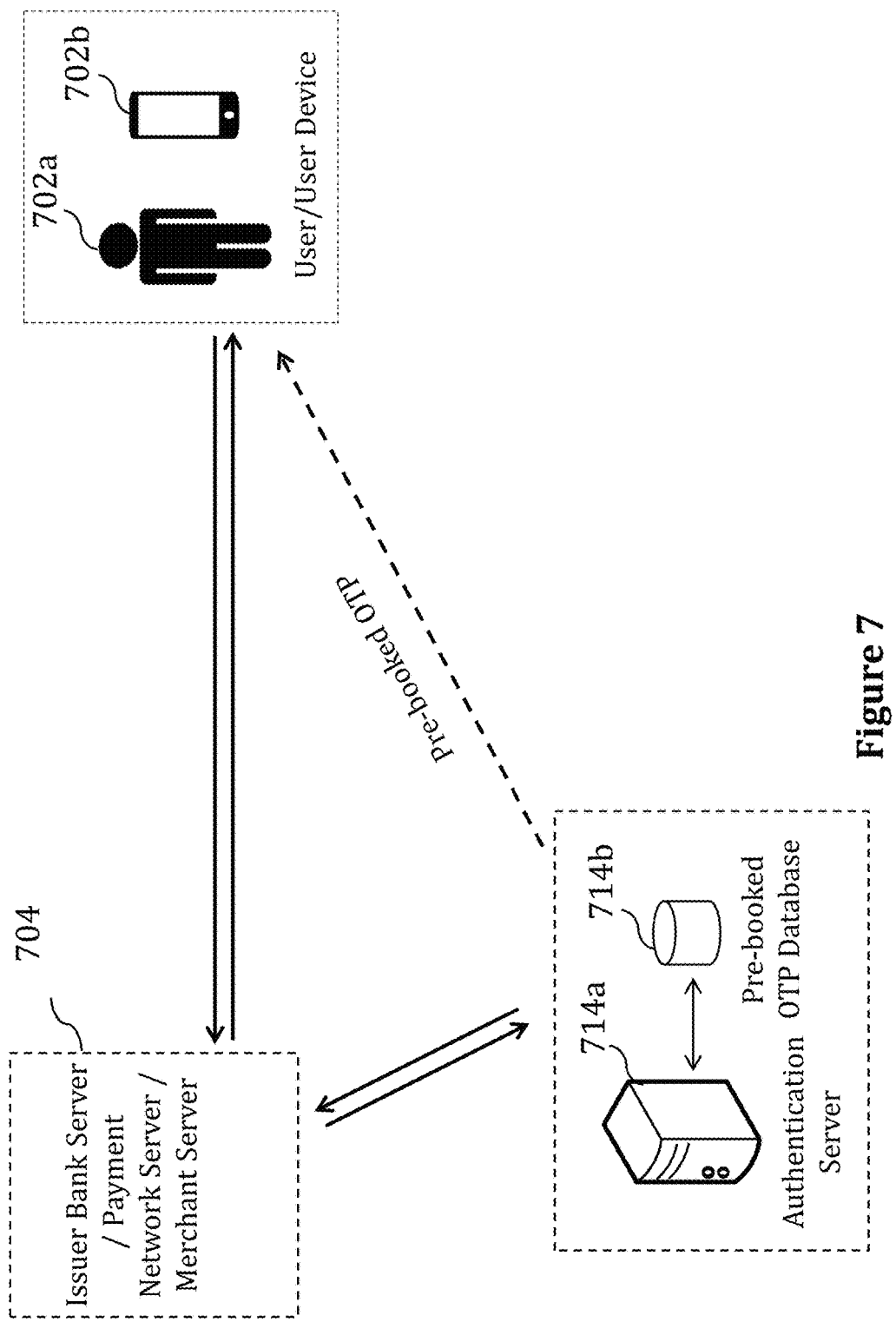
FIG. 7 illustrates a system environment that may be configured to implement the method steps of FIG. 5 or 6.

FIG. 7 illustrates a system environment 700 configured to implement the method steps of FIG. 5 or 6. System 700 comprises a server 704—which may according to the embodiment under discussion be any of an issuer bank server, payment network server or merchant server. Server 704 is communicably coupled with authentication server 714a, and pre-booked OTP database 714b. User 702a may be directly or indirectly in network communication with server 704—including through any one or more of the devices, servers or networks discussed more generally in connection with FIG. 2. Likewise, authentication server 714a may be configured for network communication between said authentication server 714a and user device 702b—so that OTPs that are generated in response to transaction requests from user 702a may be transmitted to user device 702b for user 702a to receive and access. It would be understood that implementation of the methods of FIGS. 5 and 6 discussed below may include communications through one or more intermediary servers or network nodes that are not specifically illustrated in FIG. 7.

FIG. 5 illustrates a specific embodiment of the method more generally discussed in connection with FIG. 3, wherein the user inputs instructions and/or information for generation of a pre-booked OTP to an issuer bank server or payment network server. The user may access the issuer bank server or payment network server through a web browser or through a software application made available by the issuer or payment network, and configured to enable access to the issuer bank server or payment network server.

At step 502, the user initiates a session (preferably a secure session) with the issuer bank server or payment network server through a website or software application corresponding to the issuer bank or payment network.

At step 504, the user submits to the issuer bank server or payment network server (i) an instruction to generate a pre-booked OTP, (ii) payment card or payment account details of the user—with which the generated pre-booked OTP may be associated (which payment card or payment account details may include any authentication details required for carrying out an electronic transaction through said payment card or payment account and (iii) specified transaction parameters corresponding to a proposed payment transaction that is intended to be executed by the user in the future—including any one or more of a merchant identifier, identifier corresponding to an item, article or service towards which payment is intended to be made, transaction type, transaction amount, transaction date or range of dates within which the transaction may be executed, or a defined time window within which the transaction is intended to be executed, identifiers associated with processor implemented device through which the transaction request is intended to be forwarded, or any other parameters associated with the future transaction.

It would be understood that in cases where the user initiates the session through a software application (e.g. a software application corresponding to the issuer bank or payment network stored on the user's mobile communication device), user details and payment card or payment account details of the user may be pre-stored in the software application, and may in certain embodiments be provided by the software application to the issuer bank server or payment network server without requiring the user to input such information with each instruction for generating a pre-booked OTP.

At step 506, the request for generating a pre-booked OTP along with the user inputs (and/or other information received at step 504) may be transmitted by the receiving issuer bank server or payment network server to an authentication server.

At step 508, the authentication server generates a pre-booked OTP for the purposes of authenticating the proposed transaction. Step 508 also comprises recording the generated pre-booked OTP in a database, along with associations (or relationships) between one or more of the specified transaction parameters and the pre-booked OTP in said database.

At step 510 the generated pre-booked OTP is transmitted from the authentication server to the user.

FIG. 6 illustrates another embodiment of the method more generally discussed in connection with FIG. 3, wherein the user inputs instructions and/or information for generation of a pre-booked OTP at a merchant server through which an electronic payment transaction is intended to be executed. The user may in various embodiments access the merchant server through the merchant server website (for example, using a web browser) or through a software application made available by the merchant and configured to enable access to the merchant server.

At step 602, the user initiates a session (preferably a secure session) with the merchant server through a website or software application corresponding to the merchant.

At step 604, the user submits to the issuer bank server or payment network server one or more of (i) an instruction to generate a pre-booked OTP, (ii) payment card or payment account details of the user—with which the generated pre-booked OTP may be associated (and which payment card or payment account details may include any authentication details required for carrying out an electronic transaction through said payment card or payment account) and (iii) specified transaction parameters corresponding to a proposed payment transaction that is intended to be executed by the user in the future.

It would be understood that in this embodiment, the user may not require to expressly input some of the transaction details that have been discussed in the earlier embodiments—for example, one or more of a merchant identifier, identifier corresponding to an item, article or service towards which payment is intended to be made, transaction type, transaction amount, and transaction date—as such transaction details may be determined by the merchant server based on the user's interaction with the merchant server. Examples of transaction details that are determinable by the merchant server include (i) a merchant identifier—which is determinable based on the merchant website or merchant website application, (ii) identifier corresponding to an item, article or service towards which payment is intended to be made—which may be determinable based on the user's selection of such item, article or service through the website or software application prior to requesting generation of a pre-booked OTP, (iii) transaction type, transaction amount, and/or transaction date—which again may be determinable by the user's selection of an item, article or service towards which payment is intended to be made.

At step 606, the request for generating a pre-booked OTP along with the user inputs (and/or other information received or determined at step 604) may be transmitted by the merchant server to an authentication server.

At step 608, the authentication server generates a pre-booked OTP for the purposes of authenticating the proposed transaction. Step 608 also comprises recording the generated pre-booked OTP in a database, along with an association(s) (or relationship(s)) between one or more of the specified transaction parameters and the pre-booked OTP in said database.

At step 610 the generated pre-booked OTP is transmitted from the authentication server to the user.

It would be understood that in addition to being implementable through a system environment of the type illustrated in FIG. 7, in various embodiments of the invention, the method steps of FIGS. 5 and 6 may equally be implemented within the system environment illustrated in FIG. 2 (in the same or a similar manner as has been discussed previously in connection with the method steps of FIG. 3).

Figure 8:
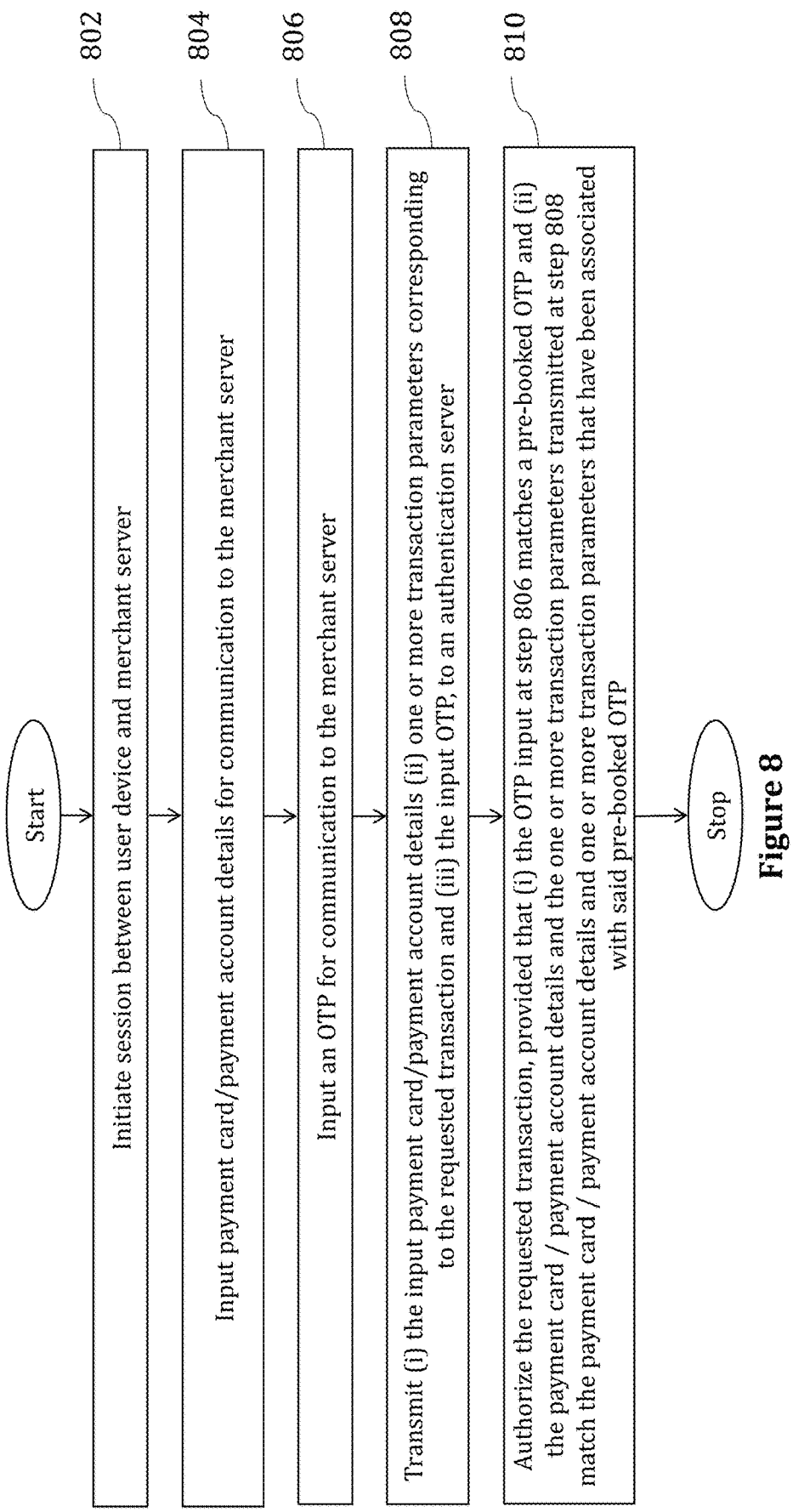
FIG. 8 illustrates a method for transaction authentication based on a pre-booked OTP that has been generated in accordance with the teachings of any of FIG. 3, 5 or 6.

FIG. 8 illustrates a method for using the pre-booked OTP that has been generated in accordance with the teachings of any of FIG. 3, 5 or 6.

Step 802 comprises initiation of a session between a user device 202b, 702b and a merchant server 204, 704. The user device 202b, 702b may comprise any processor implemented device that a user uses to execute an electronic payment transaction, and which said user device 202b, 702b is in network communication with a merchant server 204, 704.

At step 804, the user 202a, 702a communicates payment card or payment account details to the merchant server 204,

704—which payment card or payment account details may be input at the user device 202b, 702b for onward communication to the merchant server 204, 704.

At step 806, the user 202a, 702a inputs an OTP for communication to the merchant server 204, 704. It would be understood that the OTP input at step 806 may comprise a pre-booked OTP that (i) has been generated and transmitted to the user 202a, 702a in advance of (i.e. prior to) initiation of the transaction or in advance of initiating a network session for executing the transaction, and (ii) in the course of generating the pre-booked OTP, said pre-booked OTP has been associated with (a) the payment card or payment account details that are being provided to the merchant server 204, 704 at step 804 and (b) one or more transaction parameters corresponding to the transaction that is sought to be implemented at the merchant server 204, 704.

Step 808 comprises transmitting the input payment card or payment account details, one or more detected transaction parameters corresponding to the requested transaction, and the input OTP to an authentication server 214a, 714a. The detected transaction parameters may comprise one or more transaction parameters associated with the electronic payment transaction, which are determinable by the merchant server 204, 704—for example, one or more of a merchant identifier, identifier corresponding to an item, article or service for which the electronic payment transaction is sought to be executed, transaction type, transaction amount, transaction date and/or transaction time. In an embodiment where the user inputs of step 806 are received through a software application (for example a mobile communication device based software application) associated with the merchant or an issuer bank 212, 704 or payment network 210, 704 the software application may detect or determine said one or more transaction parameters based on one or more of user inputs and pre-stored data associated with the user through said software application.

Step 810 comprises authorizing the requested payment transaction, responsive to determining that (i) the OTP input at step 806 matches a pre-booked OTP and (ii) the payment card or payment account details and the one or more detected transaction parameters that have been transmitted at step 808 match corresponding payment card or payment account details and one or more specified transaction parameters that have been associated with said pre-booked OTP.

It would be understood that the payment card or payment account details and specified transaction parameters that have been associated with a pre-booked OTP may be retrieved for the purposes of the matching at step 810, from pre-booked OTP database 214b, 714b. It would further be understood that the requested payment transaction may be rejected by the authentication server in the event of (i) the input OTP not matching any pre-booked OTP, (ii) the input OTP matching a pre-booked OTP but the payment card or payment account details that have been provided with the input OTP failing to match the payment card or payment account details associated with the matched pre-booked OTP or (iii) the input OTP matching a pre-booked OTP but any one or more detected transaction parameters transmitted at step 808 failing to match the corresponding specified transaction parameters associated with the matched pre-booked OTP.

Figure 9:
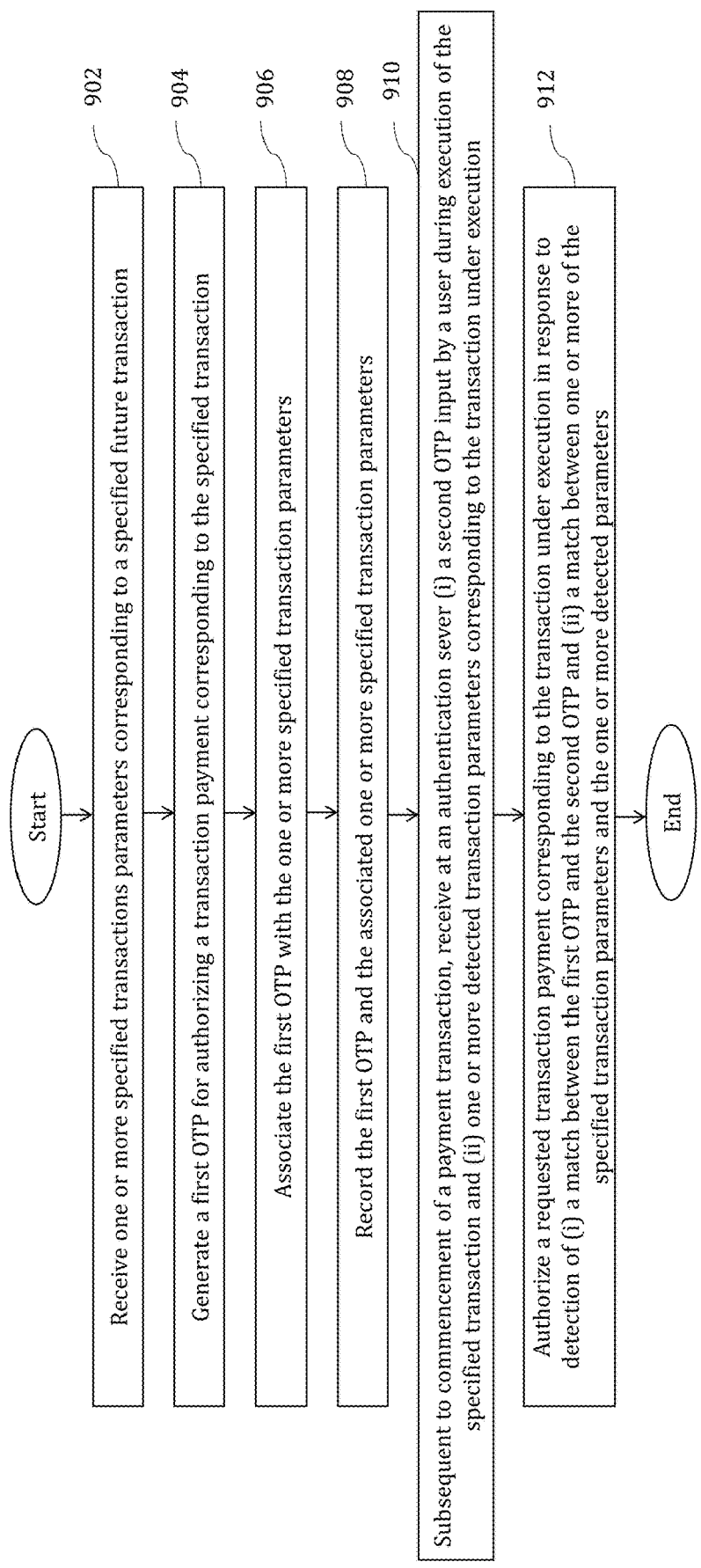
FIG. 9 illustrates an end-to-end transaction involving generation of a pre-booked OTP and subsequent transaction authentication based on the pre-booked OTP.

FIG. 9 illustrates a method consolidating the method steps described in connection with FIG. 3 and FIG. 8—for the purposes of describing an end-to-end transaction involving transaction authentication using a pre-booked OTP in accordance with the present invention.

Step 902 comprises receiving one or more specified transaction parameters corresponding to a specified transaction. The specified transaction parameters may be any of the transaction parameters previously discussed. It would be understood that the step of receiving one or more specified transaction parameters may in a specific embodiment be implemented at an authentication server 214a, 714a.

At step 904, the authentication server 214a, 714a generates, a first OTP for authorizing a transaction payment corresponding to the specified transaction.

Step 906 comprises associating the first OTP with the one or more specified transaction parameters, and step 908 comprises recording or storing the first OTP and the associated one or more specified transaction parameters within a pre-booked OTP database 214b, 714b. The first OTP may thereafter be communicated to the user that has requested the pre-booked OTP.

It will be understood that method steps 902 to 908 may be implemented in accordance with any of the method embodiments discussed previously in connection with FIGS. 3, 5 and 6.

Step 910 is executed subsequent to commencement of the specified payment transaction, and comprises receiving at an authentication server 214a, 714a (i) a second OTP input by a user subsequent to commencement of the specified transaction, and (ii) one or more detected transaction parameters corresponding to the commenced specified transaction. The second OTP and the detected transaction parameters may be received by the authentication server in accordance with any of the invention embodiments discussed in connection with FIG. 8.

Step 912 comprises authorizing the transaction payment responsive to determination of a match between (i) the first OTP and the second OTP, and (ii) the one or more specified transaction parameters and corresponding one or more detected transaction parameters.

It will be understood that method steps 910 and 912 may be implemented in accordance with any of the method embodiments discussed previously in connection with FIGS. 3, 5 and 6.

It would further be understood that in various embodiments of the invention, a user may request generation of a pre-booked OTP by logging on to the issuer bank website 212, 704, through a mobile application associated with the issuer bank, or by SMS or other electronic request communicated to the issuer bank 212, 704, or to any server or website identified by or associated with the issuer bank 212, 704.

In a specific embodiment of the invention, the authentication server 214a, 714a may be configured so as to use a specific data format for pre-booked OTPs, which specific data format is different from a data format associated with OTPs that are generated subsequent to transaction initiation. By using different format types for pre-booked OTPs versus OTPs generated during a transaction, the invention enables categorization of an OTP according to OTP type (i.e. pre-booked versus non pre-booked)—which in turn may be used to route different categories of OTPs to different authentication servers for matching purposes.

By providing for advance generation of OTPs, the invention ensures that a user may secure an OTP in advance of transaction initiation—which enables the user to execute time sensitive transactions without being subject to inherent unreliability of the underlying communication network(s) that are used for transmitting OTPs to a user.

Figure 10:
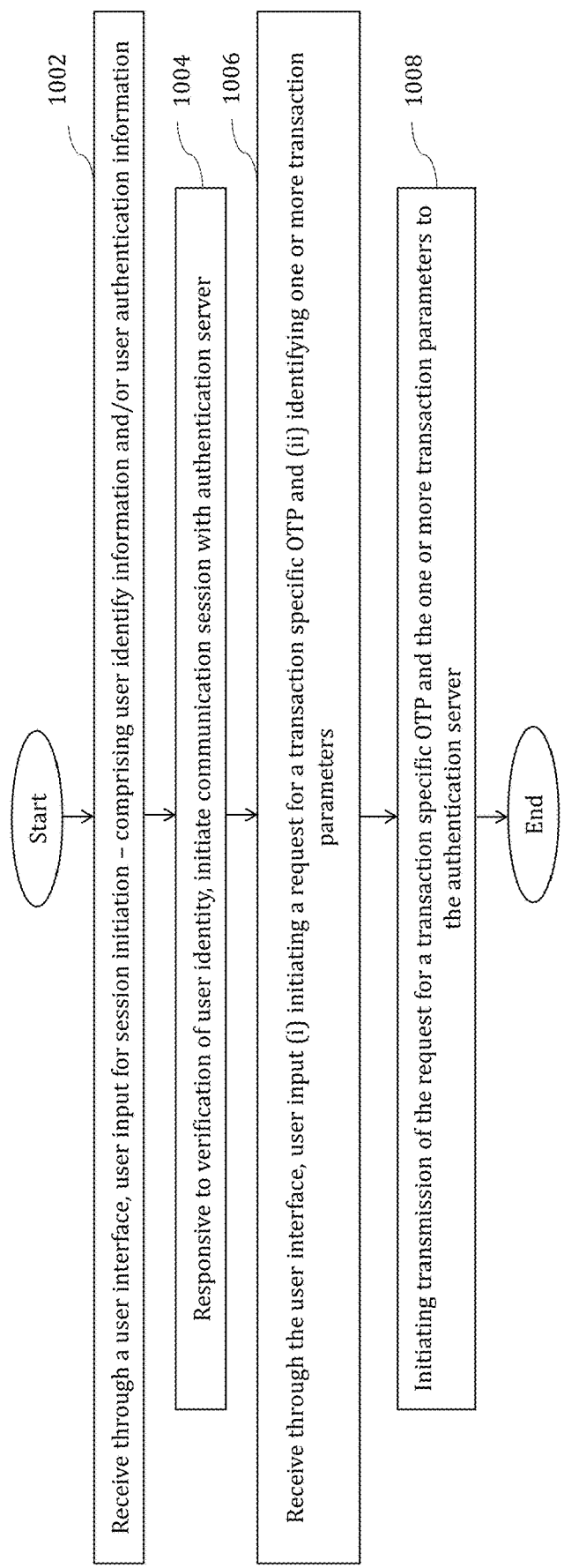

FIG. 10 illustrates a further method embodiment of the present invention, describing an implementation at a device configured to receive user inputs for initiating an OTP based transaction in accordance with the present invention. In various embodiments, the device at which said method may be implemented may comprise any of a user device 202b, 702b, a merchant server 204, 704 or issuer bank server 212, 704.

Step 1002 of FIG. 10 comprises receiving through a user interface, user input for session initiation. The user input received at step 1002 may comprise user identity information, including without limitation, one or more identifiers corresponding to a user, a user account, a user device, or a payment card or electronic payment account associated with the user. The user input at step 1002 may additionally include user authentication information—which is information used for the purpose of verifying the identity of the user, and may without limitation include any of, password or passcode information, authentication biometric information, or encrypted or unencrypted hardware or software key information. In an embodiment, user input received at step 1002 may additionally include a request or an instruction for session initiation. The user interface may comprise a user interface implemented at a user device 202b, 702b—for example, a user interface generated and/or controlled by a software application implemented on the user device 202b, 702b. Alternatively, the user interface may comprise a user interface implemented at a server—for example, a user interface generated and/or controlled by software code implemented on any one of a merchant server 204, 704 or issuer bank server 212, 704—which user interface may be remotely accessed by a user through a web browser or other software application on a user device.

Step 1004 comprises responding to verification of the user's identity by initiating a communication session with an authentication server 214a, 714a. The step of verifying the user's identity may be effected based on a comparison of the user identity information and/or user authentication information against previously registered or stored user identity information and/or user authentication information. Subject to a determination that the user identity information and/or user authentication information received at step 1002 matches previously registered user identity information and/or user authentication information, the identity of the user seeking session initiation at step 1002 is verified, and a communication session is initiated between the device at which the user interface has been implemented and an authentication server. In an embodiment, the step of user identity verification may be implemented at the device at which the user interface is implemented. In another embodiment, the step of user identity verification may be implemented at the authentication server.

It would additionally be understood that for the purposes of any of the method steps of FIG. 10, any communication(s) between a device at which a user interface is implemented and the authentication server may comprise direct or indirect network communications.

Step 1006 comprises receiving through the user interface, user input initiating a request for generation of a transaction specific OTP. Step 1006 may additionally include receiving through the user interface, user input identifying one or more transaction parameters. For the purposes of step 1006, it would be understood that the request for a transaction specific OTP and/or the one or more transaction parameters may correspond to any of the embodiments already discussed above in connection with the methods of FIG. 3, 5, 6, 8 or 9. In a specific embodiment, the one or more transaction parameters received at step 1006 may include any one or more of a merchant identifier, identifier corresponding to an item, article or service, transaction type, transaction amount, one or more dates for transaction execution, one or more times for transaction execution, and a device identifier associated with a device through which the transaction request would be received.

Step 1008 thereafter comprises initiating transmission of the request for a transaction specific OTP and the one or more transaction parameters to the authentication server. Said request for a transaction specific OTP and the one or more transaction parameters may be transmitted from the device at which the user interface is implemented (or the device at which the user inputs discussed in connection with step 1006 are received from the user) to the authentication server.

It would be understood that the authentication server may receive the request for a transaction specific OTP and the one or more transaction parameters and may thereafter implement any of the method steps or invention embodiments discussed hereinabove. In an embodiment, the authentication server may respond to receiving the request for the transaction specific OTP and the identified one or more transaction parameters by generating a first OTP and associating the first OTP with the identified one or more transaction parameters. The authentication server may additionally record the first OTP and the identified one or more specified transaction parameters (and the associations therebetween) within a non-transitory memory.

As discussed above, the authentication server may thereafter receive (i) a second OTP input by a user subsequent to commencement of a payment transaction, and (ii) one or more detected transaction parameters corresponding to said payment transaction. The authentication server may subsequently authorize an electronic payment corresponding to the payment transaction, responsive to determination of a match between the first OTP and the second OTP, and between the identified one or more identified transaction parameters and corresponding one or more detected transaction parameters.

In an embodiment of the method described in connection with FIG. 10, the device at which the user interface is implemented (or the user interface itself) may additionally be configured (i) to receive the transaction specific OTP generated by the authentication server (which transaction specific OTP has been associated with the identified one or more transaction parameters by the authentication server) and (ii) to display the received transaction specific OTP to the user through the user interface. In a specific embodiment, the authentication server may be specifically configured to transmit the generated transaction specific OTP to the device at which the user interface has been implemented—so that the transmitted transaction specific OTP can be displayed to the user through the user interface.

In an alternative embodiment, the authentication server may be configured to transmit the transaction specific OTP to a target device or target electronic account associated with the user or with a payment card or payment account corresponding to the user.

In various embodiments, the invention additionally comprises a computer program product comprising a non-transitory computer readable medium having a computer readable program code embodiment therein—said computer readable program code comprising instructions for implementation of any of the method embodiments described above.

Figure 11:
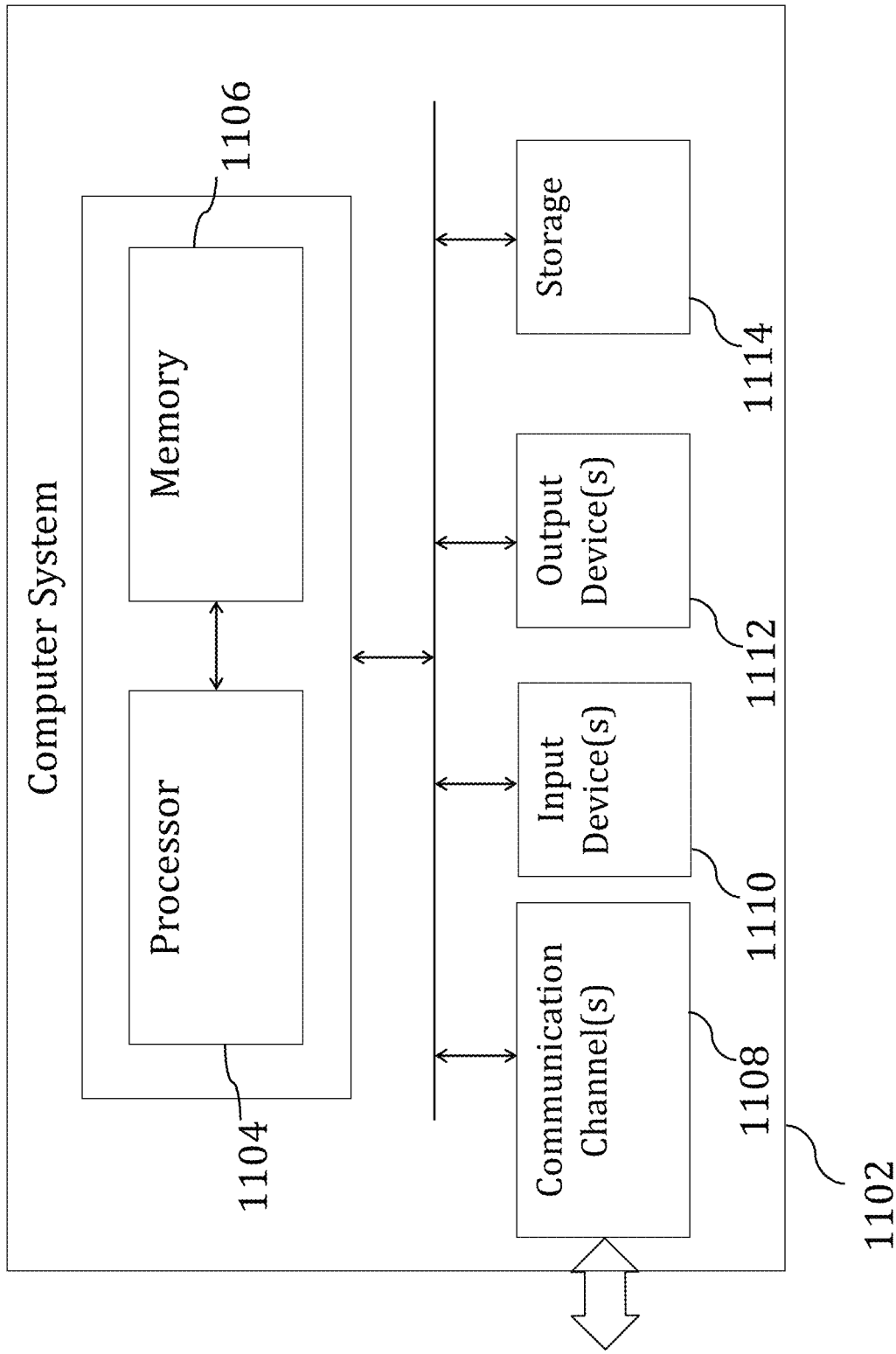
FIG. 11 illustrates an exemplary computer system of a type that may be used to implement the teachings of the present invention.

FIG. 11 illustrates an exemplary computer system 1102 for implementing the present invention.

Computer system 1102 comprises one or more processors 1104 and at least one memory 1106. Processor 1104 is configured to execute program instructions—and may be a real processor or a virtual processor. It will be understood that computer system 1102 does not suggest any limitation as to scope of use or functionality of described embodiments. The computer system 1102 may include, but is not be limited to, one or more of a general-purpose computer, a programmed microprocessor, a micro-controller, an integrated circuit, and other devices or arrangements of devices that are capable of implementing the steps that constitute the methods of the present invention. Exemplary embodiments of a computer system 1102 in accordance with the present invention may include one or more servers, desktops, laptops, tablets, smart phones, mobile phones, mobile communication devices, tablets, phablets and personal digital assistants. In an embodiment of the present invention, the memory 1106 may store software for implementing various embodiments of the present invention. The computer system 1102 may have additional components. For example, the computer system 1102 may include one or more communication channels 1108, one or more input devices 1110, one or more output devices 1112, and storage 1114. An interconnection mechanism (not shown) such as a bus, controller, or network, interconnects the components of the computer system 1102. In various embodiments of the present invention, operating system software (not shown) provides an operating environment for various software(s) executing in the computer system 1102 using a processor 1104, and manages different functionalities of the components of the computer system 1102.

The communication channel(s) 1108 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1110 may include, but is not limited to, a touch screen, a keyboard, mouse, pen, joystick, trackball, a voice device, a scanning device, or any another device that is capable of providing input to the computer system 1102. In an embodiment of the present invention, the input device(s) 1110 may be a sound card or similar device that accepts audio input in analog or digital form. The output device(s) 1112 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1102.

The storage 1114 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1102. In various embodiments of the present invention, the storage 1114 may contain program instructions for implementing any of the described embodiments.

In an embodiment of the present invention, the computer system 1102 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1102. The method described herein is typically implemented as a computer program product, comprising a set of program instructions that is executed by the computer system 1102 or any other similar device. The set of program instructions may be a series of computer readable codes stored on a tangible medium, such as a computer readable storage medium (storage 1114), for example, diskette, CD-ROM, ROM, flash drives or hard disk, or transmittable to the computer system 1102, via a modem or other interface device, over either a tangible medium, including but not limited to optical or analogue communications channel(s) 1108. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

We claim:

1. A method for one-time-password (OTP) based payment authentication, comprising:
    receiving, by an authentication server, one or more specified transaction parameters corresponding to a specified transaction;
    generating, by the authentication server, before commencement of the specified transaction, a first OTP for authorizing a transaction payment corresponding to the specified transaction, the first OTP expiring within a predefined time limit;
    storing, by the authentication server, an association of the first OTP with the one or more specified transaction parameters within a non-transitory memory;
    transmitting, by the authentication server, before commencement of the specified transaction, the first OTP via a network for provision to a user;
    receiving, by the authentication server, a second OTP input by the user subsequent to commencement of the specified transaction and one or more detected transaction parameters corresponding to the commenced specified transaction;
    retrieving, by the authentication server, the first OTP based on the one or more detected transaction parameters and the stored association between the first OTP and the one or more specified transaction parameters; and authorizing, by the authentication server, the transaction payment responsive to a determination of a match between the first OTP and the second OTP.

2. The method as claimed in claim 1, wherein the specified transaction parameters include information identifying a payment card or payment account intended to be used for the transaction payment, and wherein the first OTP is transmitted to a target device or target electronic account associated with the identified payment card or payment account.

3. The method as claimed in claim 1, wherein the specified transaction parameters or the detected transaction parameters include any one or more of a merchant identifier, identifier corresponding to an item, article or service, transaction type, transaction amount, one or more dates for transaction execution, one or more times for transaction execution, a device identifier associated with a device through which the transaction request is received, and information identifying a payment card or payment account for enabling the transaction payment.

4. The method as claimed in claim 3 wherein the information identifying the payment card or payment account includes one or more of a unique identifier associated with the payment card or payment account, issuer bank information, payment network information, validity information, card verification value (CVV) number, card holder or account holder identity information, issuer bank identifier, issue date and expiry date associated with the payment card or payment account.

5. The method as claimed in claim 1, wherein the one or more specified transaction parameters are received at the authentication server prior to initiation of the specified transaction or prior to initiation of a network session for execution of the specified transaction.

6. The method as claimed in claim 2, wherein the first OTP is transmitted to the target device or target electronic account prior to initiation of the specified transaction or prior to initiation of a network session for execution of the specified transaction.

7. The method as claimed in claim 2, wherein generating the first OTP comprises deducting a transaction amount corresponding to the specified transaction from an available credit associated with the payment card or payment account.

8. The method as claimed in claim 7, wherein deducting the transaction amount comprises deducting the transaction amount from the available credit associated with the payment card or payment account prior to initiation of the specified transaction or prior to initiation of a network session for execution of the specified transaction.

9. A computer implemented system for one-time-password (OTP) based payment authentication, comprising:
a processor implemented authentication server programmed to:
receive one or more specified transaction parameters corresponding to a specified transaction;
generate, before commencement of the specified transaction, a first OTP for authorizing a transaction payment corresponding to the specified transaction, the first OTP expiring within a predefined time limit;
store an association of the first OTP with the one or more specified transaction parameters within a database that is communicatively coupled with said authentication server;
transmit, before commencement of the specified transaction, the first OTP via a network for provision to a user;
receive a second OTP input by the user subsequent to commencement of the specified transaction;
receive one or more detected transaction parameters corresponding to the commenced specified transaction;
retrieve the first OTP based on the one or more detected transaction parameters and the stored association between the first OTP and the one or more specified transaction parameters; and
authorize the transaction payment responsive to a determination of a match between the first OTP and the second OTP.

10. The computer implemented system as claimed in claim 9, wherein the specified transaction parameters include information identifying a payment card or payment account intended to be used for the transaction payment, and wherein the first OTP is transmitted to a target device or target electronic account associated with the identified payment card or payment account.

11. The computer implemented system as claimed in claim 9, wherein the specified transaction parameters or the detected transaction parameters include any one or more of a merchant identifier, identifier corresponding to an item, article or service, transaction type, transaction amount, one or more dates for transaction execution, one or more times for transaction execution, a device identifier associated with a device through which the transaction request is received, and information identifying a payment card or payment account for enabling the transaction payment.

12. The computer implemented system as claimed in claim 11 wherein the information identifying the payment card or payment account includes one or more of a unique identifier associated with the payment card or payment account, issuer bank information, payment network information, validity information, card verification value (CVV) number, card holder or account holder identity information, issuer bank identifier, issue date and expiry date associated with the payment card or payment account.

13. The computer implemented system as claimed in claim 9, wherein the one or more specified transaction parameters are received at the authentication server prior to initiation of the specified transaction or prior to initiation of a network session for execution of the specified transaction.

14. The computer implemented system as claimed in claim 10, wherein the first OTP is transmitted to the target device or target electronic account prior to initiation of the specified transaction or prior to initiation of a network session for execution of the specified transaction.

15. The computer implemented system as claimed in claim 10, wherein to generate the first OTP, the authentication server is further programmed to deduct a transaction amount corresponding to the specified transaction from an available credit associated with the payment card or payment account.

16. The computer implemented system as claimed in claim 15, wherein the transaction amount is deducted from available credit associated with the payment card or payment account prior to initiation of the specified transaction or prior to initiation of a network session for execution of the specified transaction.

17. A non-transitory computer-readable medium comprising instructions that, when executed by a processor, cause the processor to:
receive one or more specified transaction parameters corresponding to a specified transaction;
generate, before commencement of the specified transaction, a first OTP for authorizing a transaction payment corresponding to the specified transaction, the first OTP expiring within a predefined time limit;

store an association of the first OTP with the one or more specified transaction parameters within a non-transitory memory;

transmit, before commencement of the specified transaction, the first OTP via a network for provision to a user;

receive a second OTP input by the user subsequent to commencement of the specified transaction and one or more detected transaction parameters corresponding to the commenced specified transaction;

retrieve the first OTP based on the one or more detected transaction parameters and the stored association between the first OTP and the one or more specified transaction parameters; and authorize the transaction payment responsive to a determination of a match between the first OTP and the second OTP.

18. The non-transitory computer-readable medium of claim 17, wherein the specified transaction parameters include information identifying a payment card or payment account intended to be used for the transaction payment, and wherein the first OTP is transmitted to a target device or target electronic account associated with the identified payment card or payment account.

19. The non-transitory computer-readable medium of claim 18, wherein to generate the first OTP, the instructions when executed by the processor further cause the processor to: deduct a transaction amount corresponding to the specified transaction from an available credit associated with the payment card or payment account.

20. The non-transitory computer-readable medium of claim 19, wherein to deduct the transaction amount, the instructions when executed by the processor further cause the processor to: deduct the transaction amount from the available credit associated with the payment card or payment account prior to initiation of the specified transaction or prior to initiation of a network session for execution of the specified transaction.

* * * * *